United States Patent
Vogelsang et al.

(10) Patent No.: US 7,509,806 B2
(45) Date of Patent: Mar. 31, 2009

(54) METHOD FOR OPTIMIZING THE UTILIZATION RATIO IN A DRIVE UNIT AND DRIVE UNIT

(75) Inventors: Klaus Vogelsang, Crailsheim (DE); Kurt Adleff, Crailsheim (DE); Reinhold Pittius, Crailsheim (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 0 days.

(21) Appl. No.: 10/576,865

(22) PCT Filed: Oct. 20, 2004

(86) PCT No.: PCT/EP2004/011861
§ 371 (c)(1),
(2), (4) Date: Feb. 28, 2007

(87) PCT Pub. No.: WO2005/040578
PCT Pub. Date: May 6, 2005

(65) Prior Publication Data
US 2007/0186552 A1 Aug. 16, 2007

(30) Foreign Application Priority Data
Oct. 22, 2003 (DE) .............................. 103 48 967

(51) Int. Cl.
*F02G 3/00* (2006.01)
(52) U.S. Cl. .......................................... 60/614; 60/615
(58) Field of Classification Search .................. 60/614, 60/624
See application file for complete search history.

(56) References Cited

U.S. PATENT DOCUMENTS
2,769,303 A * 11/1956 Lucia et al. .................... 60/608
(Continued)

FOREIGN PATENT DOCUMENTS
DE 19516971 11/1995
(Continued)

*Primary Examiner*—Thomas Denion
*Assistant Examiner*—Douglas J. Duff
(74) *Attorney, Agent, or Firm*—Ohlandt, Greeley, Ruggiero & Perle, L.L.P.

(57) ABSTRACT

The invention relates to a method for optimizing engine braking in a drive unit, particularly used for motor vehicles, comprising an internal combustion engine consisting of a crankshaft, and an exhaust gas turbine which is connected to a crankshaft via a transfer device. A hydrodynamic coupling is arranged in the transfer device. The invention is characterized by the following features: in one operational state corresponding to braking operation with an engine brake, the exhaust gas is operated at a working point which is characterized by the maximum acceptable limiting speed $n_{max-5}$ of the exhaust gas turbine at a minimum output moment $M_5$ and in another operational state corresponding to the partial load operation or thrust operation, the exhaust gas turbine is operated at a working point which is characterized by a minimum speed $n_{min5}$ and minimum receivable moment $M_{min-5}$, wherein adjustment of both working points is carried out by the hydrodynamic coupling, such that it can be operated according to at least one characteristic whose transferable moment corresponds to the minimum outputtable or receivable moment $M_{Min-5}$ of the exhaust gas turbine over a large part of the speed difference characterizing the slip range taking into account the multiplication of the transfer elements in the transfer device to the exhaust gas turbine.

14 Claims, 6 Drawing Sheets

DM (KW) = Driving machine (crankshaft)

U.S. PATENT DOCUMENTS

| | | | |
|---|---|---|---|
| 3,007,302 A * | 11/1961 | Vincent | 60/598 |
| 3,603,079 A * | 9/1971 | Kickbusch | 60/608 |
| 3,869,866 A * | 3/1975 | Timoney | 60/607 |
| 4,748,812 A | 6/1988 | Okada et al. | 60/614 |
| 4,803,969 A * | 2/1989 | Hiereth et al. | 123/561 |
| 4,858,440 A * | 8/1989 | Okada | 60/614 |
| 4,882,906 A * | 11/1989 | Sekiyama et al. | 60/624 |
| 4,894,992 A * | 1/1990 | Sekiyama | 60/624 |
| 4,989,410 A * | 2/1991 | Smith | 60/607 |
| 5,729,978 A * | 3/1998 | Hiereth et al. | 60/607 |

FOREIGN PATENT DOCUMENTS

| | | |
|---|---|---|
| EP | 0301547 | 7/1988 |
| WO | 02/070877 | 9/2002 |

* cited by examiner

DM (KW) = Driving machine (crankshaft)

DM (KW) = Driving machine (crankshaft)

METHOD FOR OPTIMIZING THE UTILIZATION RATIO IN A DRIVE UNIT AND DRIVE UNIT

RELATED APPLICATIONS

This application claims priority in PCT International Application No. PCT/EP2004/011861, filed Oct. 20, 2004, and German Application No. DE 103 48 967.3, filed on Oct. 22, 2003, the disclosures of which are incorporated herein by reference.

The invention concerns a method for optimizing the utilization ratio in a drive unit, in particular the action of the engine brake, especially with the features of the preamble of claim 1; in addition, it concerns a drive unit.

Drive units in turbocompound constructions are known from the prior art in a plurality of designs. These include the utilization of exhaust gas energy. As representative of these, refer to DE 195 16 971, which describes a drive unit with an internal combustion engine in the turbocompound design. This unit is provided with an exhaust gas turbine, which is connected downstream to the turbocharger and which is loaded in traction operation from the exhaust gas line of the combustion engine. This is connected to the crankshaft in a drive connection via at least one transfer device comprising a hydrodynamic coupling. It is possible in this way to utilize the residual energy still present in the exhaust gas. In this way, the energy of the exhaust gas is converted to rotational energy in the exhaust gas turbine and the drive of the crankshaft of the vehicle is additionally supported by this means. The efficiency of the driveline can be enhanced by the utilization of the exhaust gas energy for the drive of the vehicle. It is also known that the engine brake power of a vehicle can also be increased, if the driving machine, i.e., the internal combustion engine, is equipped with a so-called compression braking device, or in general also called an engine brake. By this means, the combustion chamber of the internal combustion engine is connected with the exhaust gas system in braking operation during the last segment of the compression stroke, for example, by opening the exhaust gas valve which is present. The result is that compressed air flows out of the cylinder during the compression stroke and the compression work performed during the compression stroke is not introduced again during the expansion stroke, which thus leads to an increase in the braking power of the internal combustion engine. Under certain circumstances, however, this acts counter to the input of power to the internal combustion engine, which is supplied by the coupling between the exhaust gas turbine and the internal combustion engine. During engine braking with a so-called turbocompound combustion engine, it is thus desirable to eliminate or at least to minimize the additional energy, which arises at the exhaust gas turbine due to decompression of the combustion engine during braking operation, and which is introduced to the crankshaft via the coupling with the exhaust gas turbine. Thus, measures made in the exhaust gas line are known, such as bypass installations, for example, for minimizing the gas admission to the exhaust gas turbine during braking operation. The functional states of the drive unit can be essentially divided into three basic states. These include as the first state the load region, which is characterized by a large quantity of exhaust gas, which can be made available to the exhaust gas turbine. The exhaust gas turbine is then driven by the flow of exhaust gas and, via the transfer device, i.e., the coupling to the crankshaft, delivers power to the latter. This has a positive effect on the engine efficiency. In the partial load region or thrust operation, with small quantities of exhaust gas, however, the energy contained in the exhaust gas is insufficient to accelerate the exhaust gas turbine to a speed corresponding to the speed of the internal combustion engine, taking into consideration the multiplication in the connection to the crankshaft. A coupling is thus provided by the transfer device, whereby the exhaust gas turbine is accelerated from the side of the crankshaft. The power is delivered from the crankshaft to the exhaust gas turbine; however, this acts negatively on the engine efficiency. An analogous situation exists also for the third operating state, the braking operation with the engine brake. In this case, the turbine is driven by the increased flow of exhaust gas and the power is transferred from the exhaust gas turbine to the crankshaft, which, however, in turn, has a negative effect on the braking action.

The object of the invention is thus to create a method for optimizing the utilization ratio, in particular, the efficiency and/or the engine brake effect—depending on the operational state, or, respectively, to further develop a drive unit of the type named initially in such a way that these disadvantages are avoided, and, in particular, the negative effects on engine efficiency or the intended braking operation are prevented in the partial load region as well as during braking operation. In this way, depending on the operation each time, an optimal engine braking effect or an optimal efficiency is always targeted. The expense for the structure and for technical control should be kept as small as possible.

A drive unit having an internal combustion engine with a crankshaft as well as an exhaust gas line and an exhaust gas turbine that can by loaded by the exhaust gas line and which is connected downstream to the combustion engine as well as a hydrodynamic coupling which is disposed between the crankshaft and the exhaust gas turbine is designed according to the invention in such a way that, taking into consideration the respective multiplication of the transfer elements between the hydrodynamic coupling and the exhaust gas turbine, as well as between the hydrodynamic coupling and the crankshaft, the hydrodynamic coupling is configured in such a way that the latter is suitable, in the partial load operation, taking into consideration the multiplication between the primary wheel and the exhaust gas turbine, for transferring a moment, which corresponds to a minimum receivable moment $M_{min-5}$ of the exhaust gas turbine at a low speed and, further, receives a minimum moment in the operating state of braking operation with the engine brake when the exhaust gas turbine is at maximum speed. This means that in the two operating states, the hydrodynamic coupling, which is free of a guide wheel, is characterized by a characteristic, which is depicted by a small transferable moment over the entire operating range, particularly over the speed difference range of the hydrodynamic coupling. This can be achieved by the invention according to a first solution approach with the use of a hydrodynamic coupling with invariable characteristic diagrams in the individual operating states. Such couplings usually involve couplings that cannot be close-loop controlled or open-loop regulated. This means that they have a fixed filling ratio. This filling ratio, by means of the speed ratio between the secondary wheel and the primary wheel, induces a specific transferrable moment, which then corresponds to the moment that can be received at the exhaust gas turbine with direct coupling, or is proportional to this with coupling via the transfer elements. This applies analogously to the speed. The hydrodynamic coupling is selected as a function of the exhaust gas turbine which is used, wherein, corresponding to the characteristic curves of the exhaust gas turbine as the speeds to be adjusted in a targeted manner, the limiting speed for protection from overloading, which corresponds to the maximum acceptable speed, which also can correspond to the excess speed point in the characteristic diagram of the exhaust gas turbine, and the minimum acceptable speed are given in advance, whereby in both operating points, the torque of the exhaust gas turbine corresponds to a small value, preferably the minimum value, but is not necessarily identical to it. The moment that can be transferred by the hydrodynamic coupling or the moment that can be supported by it is thus a function of the minimum torque at the exhaust gas turbine as well as the maximum acceptable speed of the exhaust gas turbine and a minimum speed as well as the transfer unit disposed between the exhaust gas turbine and the hydrodynamic coupling.

According to a second solution approach, the required transfer behavior is controlled at the hydrodynamic coupling, and is preferably regulated in open loop. In this case, the filling ratio of the hydrodynamic coupling, which can be varied, functions as the set value. The adjusting of the filling ratio is then a component of a closed-loop control or open-loop regulation of a working point of the exhaust gas turbine. Preferably a speed that is adjusted each time at the exhaust gas turbine is regulated to a maximum acceptable limiting speed during braking operation and to a minimum speed in partial load operation, whereby both of these are characterized by a predefined minimum available moment, preferably corresponding to the minimum moment. As has already been indicated, the maximum acceptable speed preferably involves the speed characterizing the excess speed point in the characteristic diagram of the exhaust gas turbine. The minimum speed, on the other hand, involves a speed with a minimum transferable moment, which preferably, however, does not necessarily correspond to the moment which also can be transferred at the maximum acceptable limiting speed. The filling ratio is thus adjusted, whereby the filling ratio can be influenced in different ways and individually depends on the concrete structural configuration of the hydrodynamic coupling and of the working medium supply system associated with this. Thus, for example, the hydrodynamic coupling always has at least one inlet and one outlet from the working chamber. These are coupled with the working medium supply system. Thus, in the simplest case, the filling ratio can be adjusted by means of the control or adjustment of the pressures at the inlet and/or outlet. Another possibility exists in adjusting a specific volumetric flow at the inlet or outlet, respectively, as well as adjusting a superimposed pressure acting on an external circuit that connects the outlet and inlet, which is also used for the circulation of working medium, for example, for purposes of cooling, whereby, however, in this case, additional measures are to be provided in order to obtain the corresponding pressure propagation. In addition, mechanical devices are conceivable for influencing the filling ratio, for example scoop tubes, which also serve for controlling the volumetric flow, by coupling them with an intermediate storage device for the working medium and also with the entrance or inlet into the working chamber. The setting of the scoop tube can be fixed or variable. However, the solution according to the invention for adjusting the working points of the exhaust gas turbine is not limited to this measure.

In order to optimize the utilization ratio, which is to be understood as optimizing the engine braking action or the efficiency, depending on the operating state, the exhaust gas turbine will thus be controlled in such a way that it is operated with minimum speed and with minimum receivable torque in the operating state of partial load region, while in the operating state of braking operation, the exhaust gas turbine with maximum speed is operated with minimum outputtable moment. This can be produced by a closed-loop control or preferably by an open-loop regulation of the corresponding speed for an exhaust gas turbine with parabola-shaped characteristic. Other characteristic curves are also conceivable, each time depending on the configuration of the coupling.

The solution according to the invention will be explained in the following on the basis of figures.

Therein, the following are shown individually:

FIGS. 1 and 1*b* illustrate in schematically simplified representation the basic structure of a drive unit configured according to the invention;

FIGS. 2*a* and 2*b* illustrate in schematically simplified representation the method according to the invention for optimizing the engine braking effect in the operating state of braking with the engine brake based on patterns of signal flow;

FIGS. 3*a* and 3*b* give characteristic coupling curves, in particular, pump characteristics for a coupling used according to the invention with fixed filling ratio and variable filling ratio;

Figure 1:
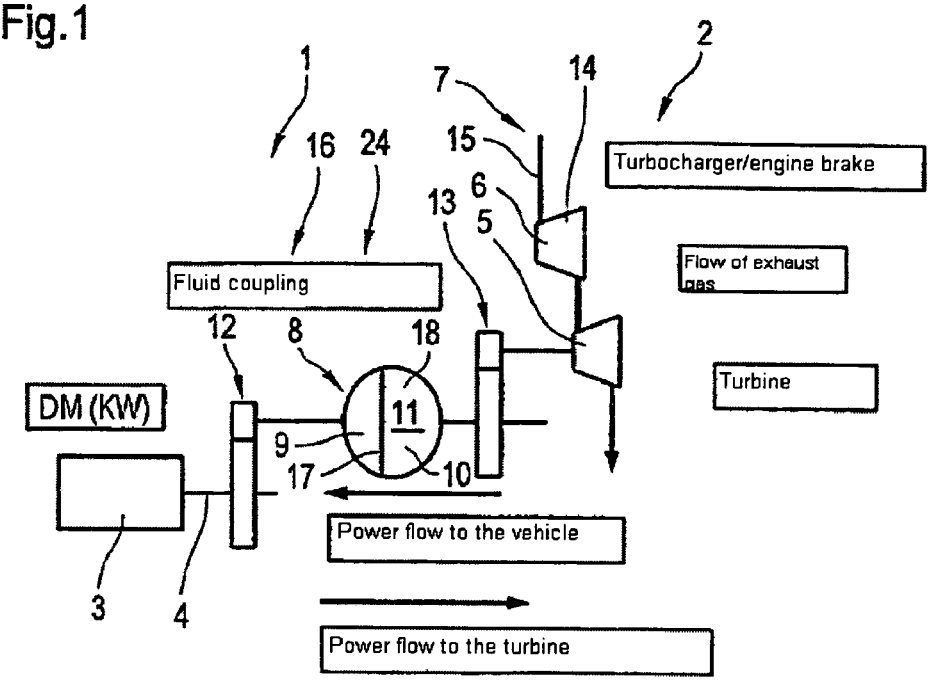

FIG. 1 illustrates in a schematically simplified representation, which is based on an excerpt from a driveline 1, the basic structure of a turbocompound system 2. The driveline comprises a driving machine in the form of an internal combustion engine 3 and a crankshaft 4. Further, an exhaust gas turbine 5 is provided, which is impinged on by the flow of exhaust gas of internal combustion engine 3. This is connected downstream to a turbocharger 6 and thus is not a component of the latter. The exhaust gas turbine 5 is thus impinged on by an exhaust gas line 7. The exhaust gas turbine 5 is also coupled mechanically with crankshaft 4, i.e., it has a drive connection with it via a transfer device 16. A hydrodynamic coupling 8 is provided in the coupling between crankshaft 4 and exhaust gas turbine 5, i.e., the transfer device 16. This coupling comprises a primary wheel 10 and a secondary wheel 9, which together form a working chamber 11. The hydrodynamic coupling 8 is thus free of a guide wheel or stator. The secondary wheel 9 is thus at least indirectly resistant to rotation with the crankshaft 4, i.e., directly or via additional transfer elements, for example in the form of speed/torque conversion devices in the form of intermediate gears. The primary wheel 10 is connected to the exhaust gas turbine 5 at least indirectly, i.e., preferably directly or via additional transfer elements. In the case shown, the coupling is produced between secondary wheel 9 of the hydrodynamic coupling 8 and the crankshaft 4 via a spur gear set 12. The secondary wheel 9 and the exhaust gas turbine 5 are coupled via another spur gear set 13. The direct coupling or the intermediate connection of other or additional speed/torque conversion devices would also be conceivable. In both cases, the multiplication of spur gear sets 12 und 13 is formed each time as a step-up gear. The exhaust gas turbine 5 is thus disposed parallel to the crankshaft 4. An arrangement at an angle, which is not shown here, whereby the transfer elements would be configured correspondingly would also be conceivable. The exhaust gas turbine 5 is connected in series to the turbocharger 6 or the engine brake, respectively. The turbocharger 6 is constructed with a first turbine stage, which is coupled to the exhaust gas line 7 and drives a compressor stage 14 in the inlet line 15. The second turbine stage, which is disposed on the side of the first turbine stage which lies downstream, or the compressor stage 14, respectively, is formed by the exhaust gas turbine 5. The mode of operation of drive unit 1 in conventional construction would be characterized essentially by the following named operating states. In the first operating state, which is also called load operation with a high quantity of exhaust gas, the exhaust gas turbine 5 is driven by the flow of exhaust gas in the exhaust gas line 7 and delivers power to the crankshaft 4 via the transfer device 16. This acts positively on the total efficiency of the engine. In a second operating state, which is also denoted partial load operation or thrust operation, only a small quantity of exhaust gas is available in the exhaust gas line 7. The energy contained in the exhaust gas is thus insufficient in the case of conventional drive units to accelerate the exhaust gas turbine 5 to the speed $n_3$ corresponding to the speed of the internal combustion engine 3, taking into consideration the multiplication in the transfer device 16, in particular, between hydrodynamic coupling 8 and exhaust gas turbine 5. The exhaust gas turbine 5 can be accelerated from the side of crankshaft 4 by means of the drive connection between crankshaft 4 and exhaust gas turbine 5 via the hydrodynamic coupling 8. This leads to the circumstance that power is guided from crankshaft 4 to exhaust gas turbine 5, and this power is no longer available for normal operation and this acts negatively on the engine efficiency. The third operating state in the case of conventional drivelines without the solution according to the invention is characterized by the fact that this state is the braking operation with the engine brake. In this case, the exhaust gas turbine 5 is driven by an elevated flow of exhaust gas in the exhaust gas line 7. The power then flows from the exhaust gas turbine 5 to crankshaft 4. This again acts negatively on the action of the engine brake. In order to avoid the named disadvantages, the operation of the exhaust gas turbine 5 according to the invention is optimized by controlling the behavior of the power transfer in the transfer device 16 with respect to the operating state of exhaust gas turbine 5. According to the invention, for this purpose, in the operating state of braking operation with the engine brake, the exhaust gas turbine 5 is controlled in such a way that it is driven with a speed $n_5$, which corresponds to a maximum acceptable speed $n_{max-5}$, i.e., a so-called limiting speed $n_{limit5}$ of exhaust gas turbine 5. The exhaust gas turbine 5 or its mode of operation can thus be described by a characteristic curve in which the useful turbine moment $M_5$ made available by this is smaller than in the case of slower speeds. The limiting speed $n_{limit5}$ thus corresponds to the speed at which disruptions of the exhaust gas turbine 5 can still be reliably prevented. The hydrodynamic coupling 8 thus functions as a setting device for the control. In order to limit the speed $n_5$ of the exhaust gas turbine 5, a torque must be supported via the hydrodynamic coupling 8 integrated in the transfer unit 16. This torque, however, counteracts the braking moment of the engine brake via the connection to the crankshaft 4. Therefore, this braking moment is to be kept to a minimum according to the invention. Since, corresponding to the known characteristic curve of exhaust gas turbine 5, the torque in the case of this limiting speed $n_{limit5}$ is smaller than for slower speeds, the goal is to operate the exhaust gas turbine 5 as often as possible at this operating point. The exhaust gas turbine 5 is thus controlled in such a way that it is operated as much as possible at its maximum speed $n_{max5}$. At the same time, however, the speed of the internal combustion engine 3 between the turbine side, i.e, the primary wheel 10 of the hydrodynamic coupling 8, and the crankshaft side, i.e., the secondary wheel 9, can be varied.

Figure 1B:
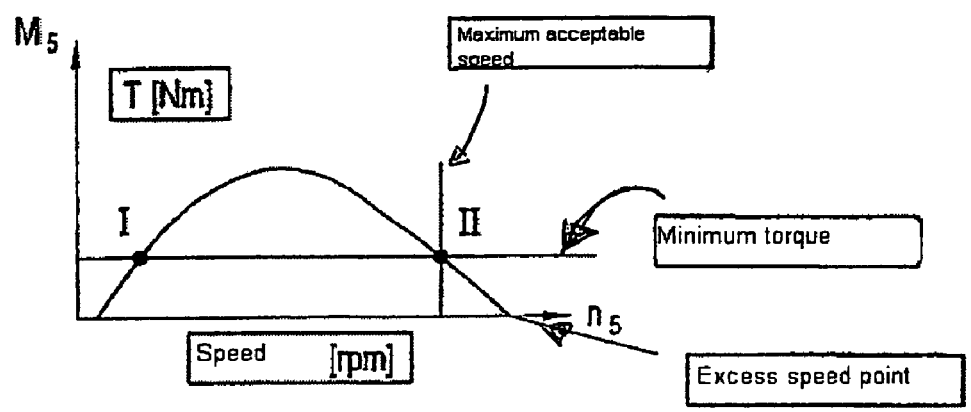

FIG. 1b illustrates for this purpose the characteristic of the exhaust gas turbine 5 on the basis of a speed $n_5$/torque $M_5$ diagram. The torque $M_5$ thus corresponds to the moment that can be received by the exhaust gas turbine or the moment that can be output by the latter to the transfer device, each time depending on the direction of power flow. The preferably parabola-shaped course is thus characterized by two working points I and II, which are associated with the minimum receivable or outputtable moments. These are applied for controlling or adjusting in the specified operating states of partial load or thrust load and of engine brake operation. It is thus attempted to optimize the entire system by defining a working point in the partial load operation in the region of working point I and a working point during the engine braking operation in the region of working point II, the working points being characterized by a minimum moment. In the simplest case, this is conducted by the automatic adjusting of these working points by selection of the suitable hydrodynamic coupling 8 with fixed filling ratios FG in the individual operating states, whereby these are invariable for the respective operating state, but vary between the individual operating states or by controlling the speed of the exhaust gas turbine 5 by controlling the transfer behavior of the hydrodynamic coupling 8, in particular, the filling ratio FG.

Figure 3A:
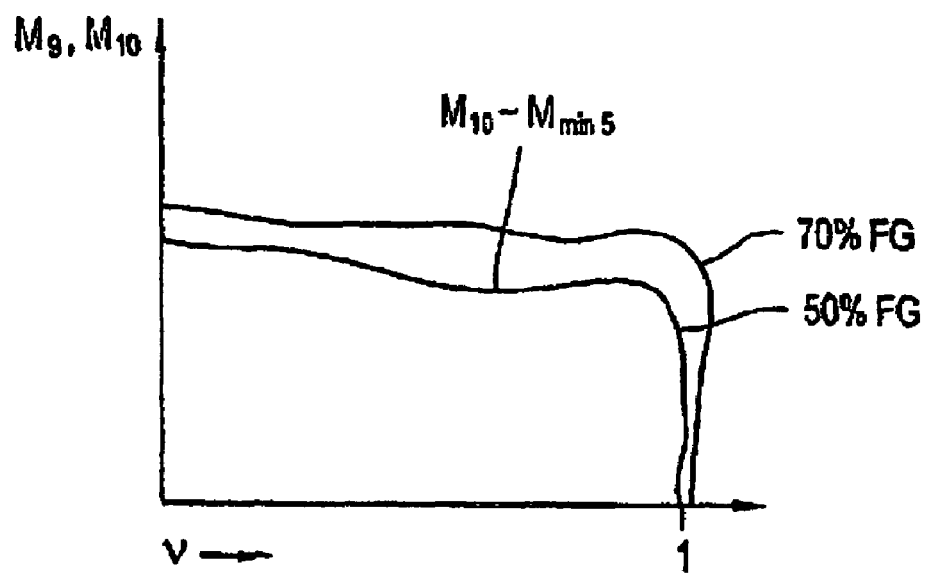

According to the first solution approach, a hydrodynamic coupling 8 is selected with corresponding characteristic according to FIG. 3a, whereby these curves are invariable and are characterized by a constant filling ratio of coupling 8. The hydrodynamic coupling 8 is thus designed in such a way that it is suitable, with a filling ratio FG of specific magnitude, to reliably support at the hydrodynamic coupling 8 the moment $M_{10}$ applied to the secondary wheel 9, taking into consideration the multiplication of the transfer elements, in particular speed/torque conversion devices, which are disposed between the exhaust gas turbine 5 and the hydrodynamic coupling 8, here the spur gear set 13. The moment $M_{10}$ is thus proportional to the moment $M_5$ output by the exhaust gas turbine 5. The hydrodynamic coupling 8 is thus designed in such a way that its characteristic curve is characterized by the speed ratio between secondary wheel 9 and primary wheel 10, referred to the moment $M_{10}$ receivable by the primary wheel 10. Taking into consideration the multiplication of the spur gear set 13 or the transfer elements disposed between the primary wheel 10 and the exhaust gas turbine 5, this moment thus corresponds to the minimum torque $M_{min5}$ that can be output at the exhaust gas turbine 5, i.e., it is directly proportional to it.

The hydrodynamic coupling 8 is operated in such a way that over a large part of the range of the speed ratio γ between secondary wheel 9 and primary wheel 10, a specific moment can be supported, which corresponds to the minimum moment $M_{min-5}$ made available by the exhaust gas turbine, taking into consideration the transfer elements. The coupling is operated with invariable filling ratio FG. No additional control mechanisms are necessary. The desired behavior is achieved on the basis of the properties inherent in the coupling with fixed filling ratio alone.

Figure 2B:
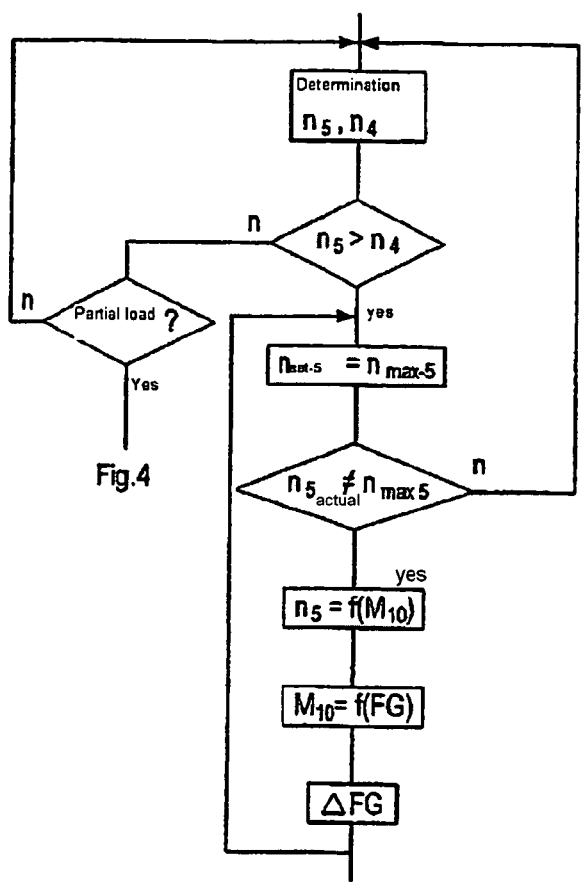
Figure 2A:
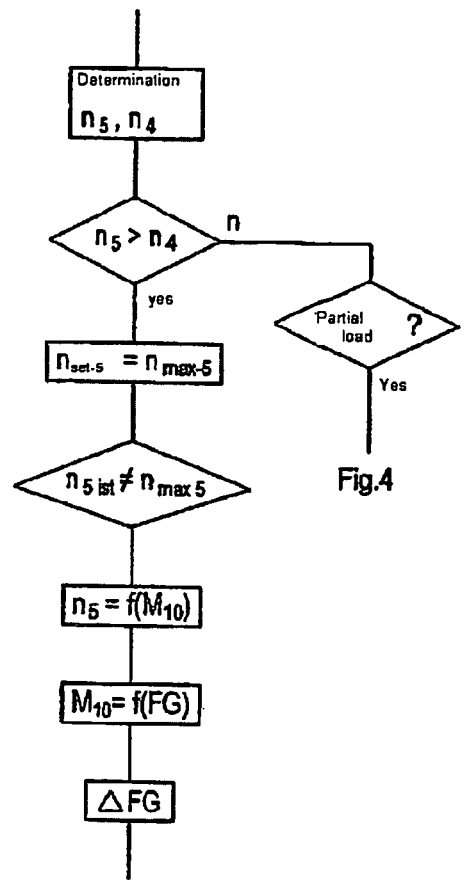
Figure 3B:
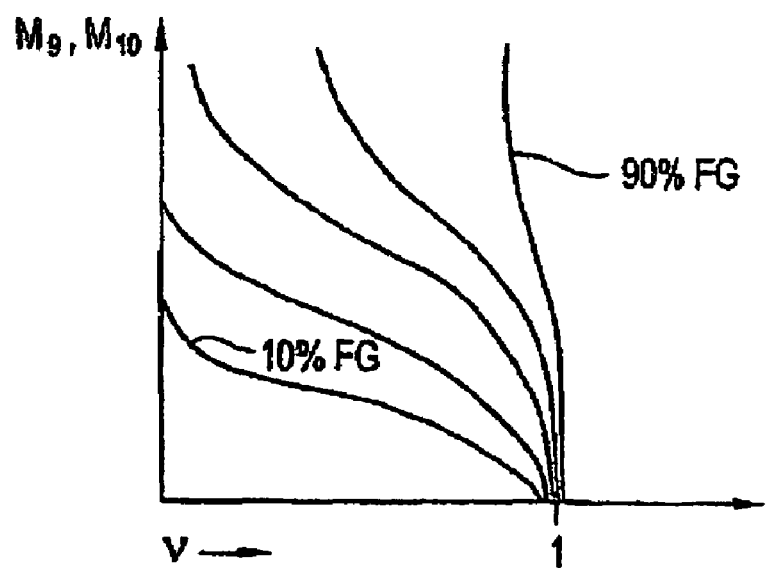

According to a second solution approach, the transfer capacity of the coupling is adjusted correspondingly. Coupling characteristics for setting couplings are shown in FIG. 3b. Depending on the direction of power flow, these apply to the moment $M_{10}$, $M_9$, which can be received at primary wheel 10 or secondary wheel 9. Preferably, this procedure is integrated in a method for the regulation of the speed $n_5$ of the exhaust gas turbine 5, as shown in FIG. 2b, whereby, when the third operating state is present, i.e., braking operation with the engine brake, which is characterized by a speed $n_5$ greater than the speed $n_4$ taking into consideration the transfer behavior or the transfer moment at the crankshaft, a set value $n_{set-5}$ is determined, which corresponds to the maximum acceptable speed $n_{max-5}$ of the exhaust gas turbine 5. Taking into consideration the transfer elements, this speed is proportional to the speed $n_{10}$ at primary wheel 10 of the hydrodynamic coupling 8. A minimum torque $M_{min-5}$ to be made available results, which is associated with this speed $n_{max-5}$ in the characteristic for the exhaust gas turbine 5. Taking into consideration the transfer elements between exhaust gas turbine 5 and primary wheel 10, in particular at spur gear set 13, a receivable moment $M_{10}$, which must be supported at secondary wheel 9 thus results for the primary wheel 10. In order to support this moment, the transfer capacity of coupling 8 is accordingly to be given in advance. This is accomplished by adjusting the filling ratio FG. That is, the transfer capactity of the hydrodynamic coupling 8, in particular for the power transfer from the primary wheel 10 to the secondary wheel 9 is also produced here due to the influencing of the mass flow, i.e., the filling ratio FG. Thus, different set values can be drawn on for adjusting the filling ratio FG. Functioning as these values, for example, in the case of fillable couplings, which are characterized by an inlet 17 for working medium in the working chamber and at least one outlet 18 from the working chamber are at least a pressure $P_{17, 18}$ at the inlet and/or outlet or a pressure difference at these outlets or the volumetric flows $V_{17, 18}$ at the inlet and/or outlet which are made available in these regions, as well as, when a separate circuit is used for the working medium, particularly a closed circuit 19 to the working circuit, a static pressure superimposed on the latter, as well as all measures for changing the quantity of filling agent and/or influencing the flows, for example variable or stationary scoop tubes. The adjusting of the filling ratio FG at the hydrodynamic coupling 8, in particular at working chamber 11, is thus integrated in the control path of the control of speed $n_5$ of the exhaust gas turbine. This also applies analogously in the design of the method as an open-loop regulation. In this case, the actual speed at the exhaust gas turbine $n_{actual-5}$ is fed back and the hydrodynamic coupling 8 is controlled correspondingly, according to the deviance of the regulated open-loop value from the set speed $n_{set-5}$. FIG. 2a illustrates the adjusting of the speed of the exhaust gas turbine $n_{actual-5}$ by a closed-loop control, while FIG. 2b reproduces the open-loop regulation, i.e. continuous feedback and comparison of speeds. In the methods described in FIGS. 2a and 2b, the named values can thus either be directly determined or they may be values that characterize these values, at least indirectly, i.e., values that are functionally related to these values can be determined.

In the second operating state, the speed $n_5$ at the exhaust gas turbine 5 is kept at the smallest possible level according to the invention. However, since the speed at the internal combustion engine 3 is variable, it is necessary that a high slip is presented in coupling 8 in this case of very low torque M. That is, the internal combustion engine 3 rotates relatively more rapidly than the exhaust gas turbine 5. This problem is solved according to the first solution approach by the hydrodynamic coupling 8 with correspondingly invariable characteristic according to FIG. 3a for any filling ratio, whereby this characteristic also must satisfy the corresponding requirements with respect to the already described third operating state. This means that the hydrodynamic coupling 8 is operated with a constant filling ratio FG, which is characterized as a function of the slip, or of the speed difference between secondary wheel 9 and primary wheel 10, by a minimum moment $M_{min-5}$ of the exhaust gas turbine, which is proportional to the moment to be transferred via the hydrodynamic coupling 8. The hydrodynamic coupling 8 used is thus designed for both operating states: operating state 3, i.e., braking with the engine brake, and operating state 2, i.e., partial load operation or thrust operation. Thus a hydrodynamic coupling 8 is used, whose characteristic diagram is characterized by a minimum transferable moment M with a very large working range of hydrodynamic coupling 8. The filling ratio FG that characterizes the invariable characteristic and is fixed in advance is selected in such a way that, taking into consideration the transfer elements between the hydrodynamic coupling 8 and the exhaust gas turbine 5, a minimum moment can then be received by the exhaust gas turbine from the side of the crankshaft 4. This invariable coupling characteristic is presented in FIG. 3a for both operating states. FIG. 3b* illustrates, in comparison to the characteristic of a closed-loop control, an open-loop regulated hydrodynamic coupling 8.

*This figure appears to be misnumbered as FIG. 3a in the drawings—Trans. note.

Figure 4:
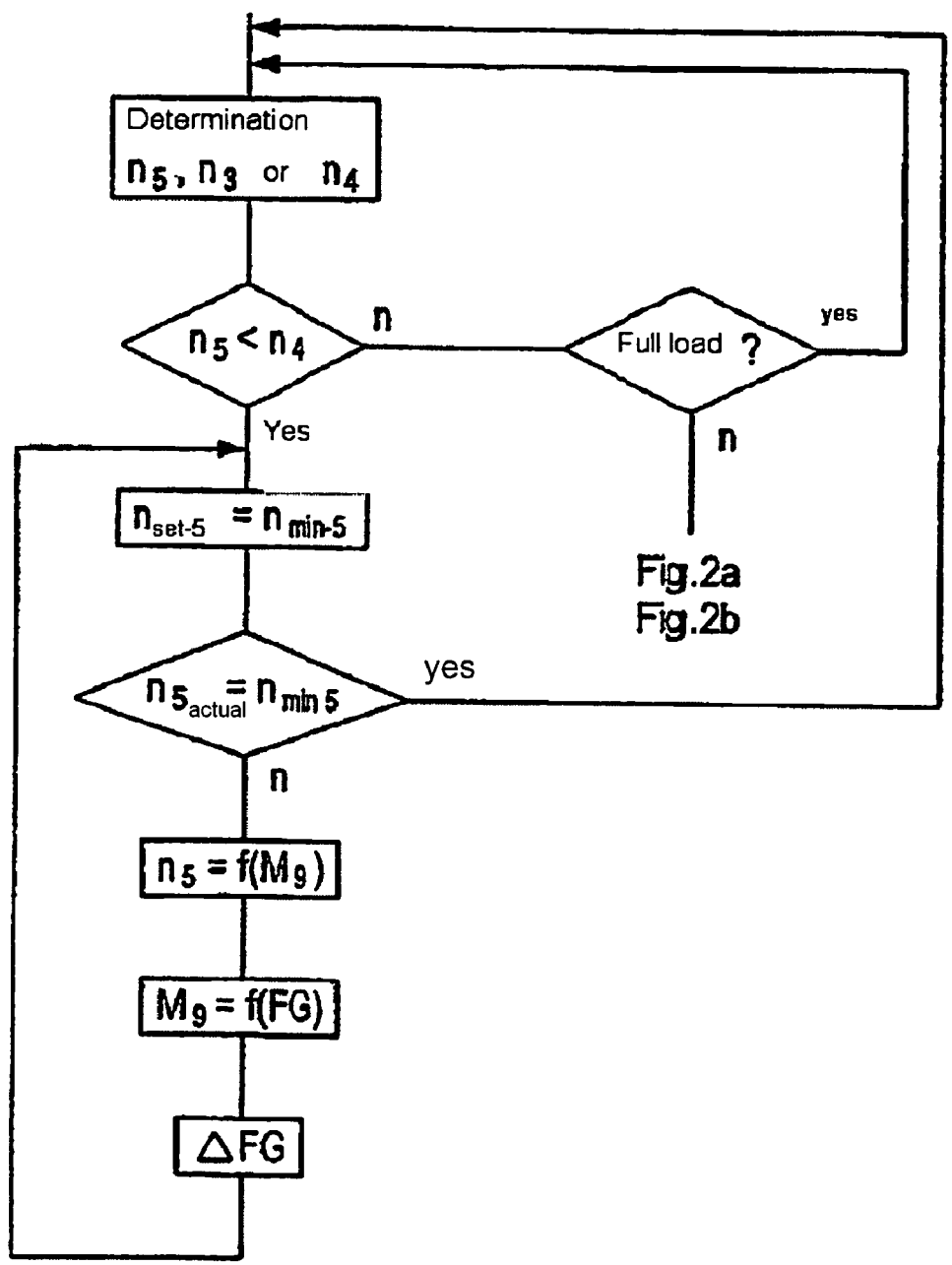
FIG. 4 illustrates the method according to the invention in the operating state of full load operation, based on a signal flow pattern.

FIG. 4 illustrates yet once more according to the second solution approach the control of the transfer capacity as a function of the speed difference γ between exhaust gas turbine 5 and crankshaft 4, in particular on the turbine side and on the crankshaft side of the hydrodynamic coupling 8 for the second operating state. According to a first possible embodiment, a control of the speed of the exhaust gas turbine $n_{set-5}$ is also produced here, whereby this value is kept as small as possible This speed thus corresponds preferably to a lower minimum limiting speed $n_{min-5}$ of the exhaust gas turbine 5. This is determined from the characteristic for the exhaust gas turbine, in particular of the torque speed characteristic according to FIG. 1b. Depending on the magnitude of the speed $n_3$ of the driving machine or particularly of internal combustion engine 3, or the speed $n_4$ of crankshaft 4, the speed $n_{10}$ proportional to the speed at the exhaust gas turbine 5 is then adjusted in order to adjust the speed $n_5$ at the exhaust gas turbine 5, also taking into consideration the transfer behavior via the transfer elements, particularly the spur gear set at the primary wheel 10 of the hydrodynamic coupling 8. This is a function of the transferable moment $M_8$ of a hydrodynamic coupling, in particular of the moment $M_9$ that can be received by the secondary wheel 9 in this operating state of the crankshaft and the speed $n_9$ at the secondary wheel 9, which in turn is directly proportional to the speed $n_4$ of the crankshaft 4 based on the coupling via the transfer elements, particularly the spur gear set 12. The moment $M_8$ that can be transferred via the hydrodynamic coupling 8 and thus the moment $M_9$ that can be received by the secondary wheel 9 for the control of the transferable moment $M_8$ or the speed $n_{10}$ at the primary wheel 10 is thus a function of the filling ratio FG of the hydrodynamic coupling. The filling ratio FG also functions here as a set value in the control, in particular in the control path, for adjusting the minimum speed at the exhaust gas turbine 5. Thus the filling ratio FG can be closed-loop controlled or it may also be open-loop regulated. The filling ratio can thus be adjusted as already described by specifying set values for the pressures to be adjusted at the inlet and outlet as well as of the volumetric flows $V_{17, 18}$ introduced via the latter, or the corresponding setting devices for influencing the filling ratio, for example, variable or stationary scoop tubes. In addition, overflow pipes with or without valve technology connected downstream or any desirable combinations of different known principles, which will not be detailed here, are also conceivable, since these are part of the knowledge of the competent person skilled in the art.

According to a particularly advantageous configuration, here the adjusting of the minimum acceptable speed $n_{min-5}$ is carried out in the form of an open-loop regulation, i.e., the current actual speed at the exhaust gas turbine $n_{actual-5}$ is fed back and compared with the set value. The current actual speed of the turbine $n_{actual-5}$ can be directly determined in this way or a value describing this speed at least indirectly can be found, whereby this value can then be monitored. In the simplest case, however, a speed recording is made, since this offers the fewest problems. The adjusting of the filling ratio is thus a component of the open-loop regulation path.

Figure 5:
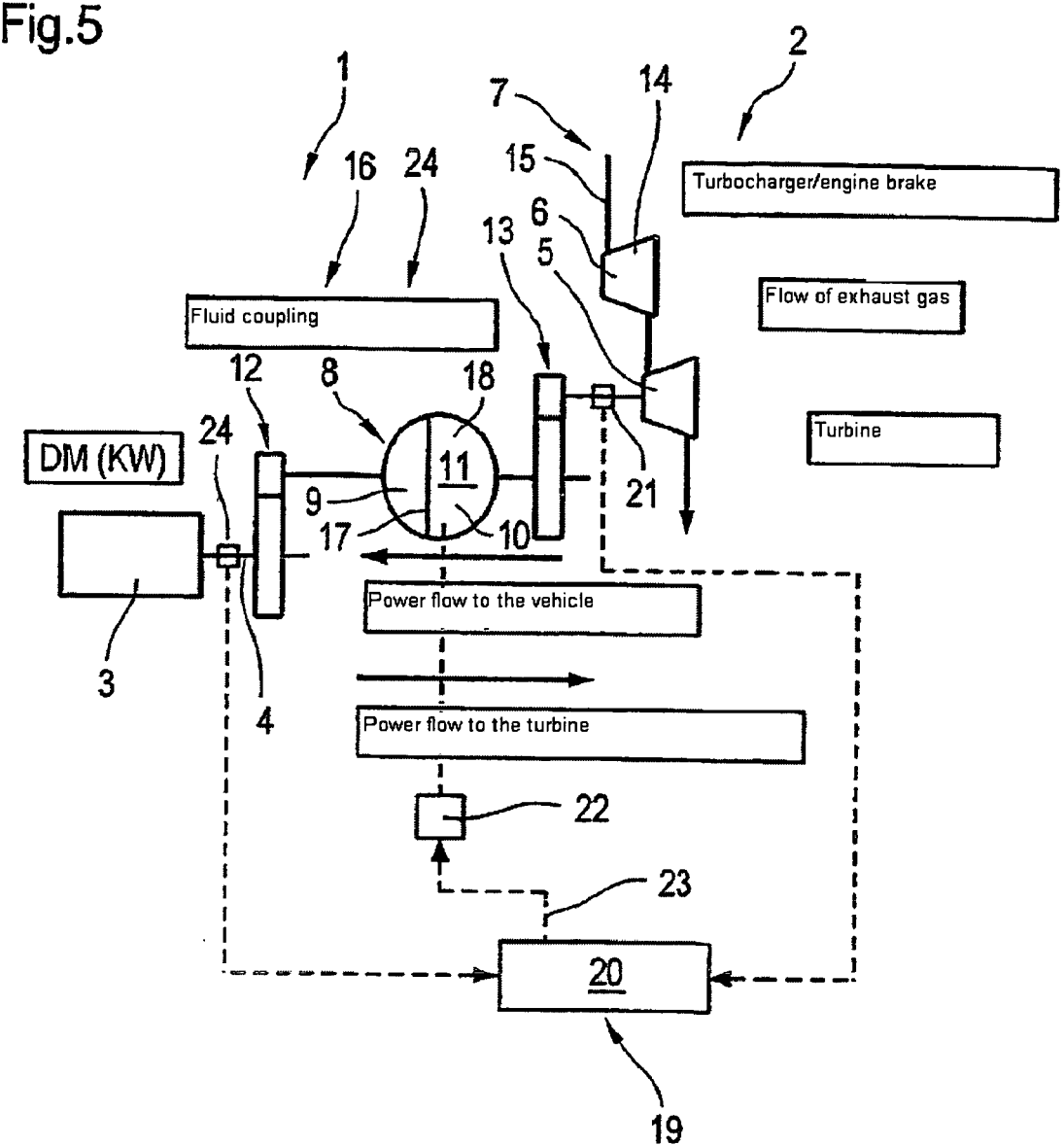
FIG. 5 illustrates the arrangement of the control device relative to the individual components in the driveline, based on an embodiment according to FIG. 1.

FIG. 5 illustrates once more, in schematically simplified representation based on the basic structure of driveline 1, the arrangement of a closed-loop control and/or open-loop regulating device 19 for exhaust gas turbine 5, comprising at least one assembly of components that take over this function as a control device in the form of a structural unit, or in the form of a virtual control device of existing closed-loop control and/or open-loop regulating device 20, which is coupled with at least a device for recording at least one value describing the speed $n_5$ and the speed of the exhaust gas turbine 5 as well as a device for recording at least one value describing the speed of crankshaft 4, at least indirectly, wherein these devices are denoted here by references 21 and 24 and in the simplest case are present in the form of a speed sensor. These devices can also generate a corresponding input signal for [closed-loop control and]/or open-loop regulating device 20. In addition, the closed-loop control and/or open-loop regulating device 19 comprises a setting device 22, which is assigned to the hydrodynamic coupling 8 and serves for the change of transfer behavior of the hydrodynamic coupling 8. The setting device 22 can therefore be designed in many different configurations. Taken individually, the latter depend on the concrete type of influencing of the filling ratio FG of the hydrodynamic coupling. The setting device 22 is thus coupled with at least one output 23 of the closed-loop control and/or open-loop regulating device 20. The closed-loop control and/or open-loop regulating device 20 may involve a closed-loop control and/or an open-loop regulating device of the vehicle that is already present in vehicles without anything further, or closed-loop control and/or open-loop regulating devices of other drive components, for example a transmission control.

LIST OF REFERENCE NUMBERS

1 Driveline
2 Turbocompound system
3 Driving machine, internal combustion engine
4 Crankshaft
5 Exhaust gas turbine
6 Turbocharger
7 Exhaust gas line
8 Hydrodynamic coupling
9 Secondary wheel
10 Primary wheel
11 Working chamber
12 Spur gear
13 Spur gear set
14 Compression stage
15 Inlet line
16 Transfer device
17 Inlet
18 Outlet
19 Closed-loop control and/or open-loop regulating device
20 Closed-loop control and/or open-loop regulating device
21 Device for recording at least one value describing the speed of the exhaust gas turbine, at least indirectly
22 Setting device
23 Output
24 Device for recording at least one value describing the speed of the crankshaft 4, at least indirectly

The invention claimed is:

1. A method for optimizing the action of the engine brake in a drive unit in a motor vehicle comprising:
    providing an internal combustion engine comprising a crankshaft;
    providing an exhaust gas turbine along an exhaust gas flow of the internal combustion engine for the conversion of exhaust gas energy into drive energy, the exhaust gas turbine being operably connected to the crankshaft via a transfer device;
    providing a hydrodynamic coupling comprising a primary wheel and a secondary wheel which is disposed in the transfer device, wherein the secondary wheel is coupled with the crankshaft and the primary wheel is coupled with the exhaust gas turbine;
    operating the exhaust gas turbine at a first working point during a braking operation, the first working point having a maximum acceptable limiting speed $n_{max-5}$ of the exhaust gas turbine with a minimum outputtable moment $M_5$, and
    operating the exhaust gas turbine at a second working point during a partial load or thrust operation, the second working point having a minimum speed $n_{min-5}$ and a minimum receivable moment $M_{min-5}$,
    wherein adjusting of the first and second working points is conducted via the hydrodynamic coupling, wherein the transferable moment of the hydrodynamic coupling corresponds to the minimum outputtable moment $M_5$ or the minimum receivable moment $M_{min-5}$ that is transferred by the exhaust gas turbine over most of the speed difference over time, taking into consideration the gear ratio of the transfer elements in the transfer device relative to the exhaust gas turbine,
    wherein the hydrodynamic coupling has a moment transfer equal to the minimum outputtable moment $M_5$ during the braking operation, and
    wherein the exhaust gas turbine has a control speed that is produced whereby the control speed is equal to the minimum speed $n_{min-5}$ that is kept as small as possible during the partial load or thrust operation.

2. The method of claim 1, wherein the hydrodynamic coupling has a constant filling ratio FG, the filling ratio FG having a moment course which lies, over a substantial portion of the speed difference, in the region of the minimum outputtable moment $M_5$ or the minimum receivable moment $M_{min-5}$ that is transferred by the exhaust gas turbine.

3. The method of claim 1, further comprising controlling a filling ratio FG of the hydrodynamic coupling based at least on one of a closed loop and a regulated open loop.

4. The method of claim 3, wherein the closed-loop control or open-loop regulation of the filling ratio FG is regulated by at least one of the following values:
    the pressure at an inlet of a working chamber of the hydrodynamic coupling and/or at an outlet of the working chamber of the hydrodynamic coupling,
    the pressure difference between the inlet and outlet of the working chamber,
    the volumetric flow at the inlet and/or outlet of the working chamber, or
    the quantity of working medium discharged.

5. The method of claim 1, wherein the first and second working points are adjusted by closed-loop control of the speed $n_5$ or a value of the exhaust gas turbine that characterizes this speed.

6. The method of claim 1, wherein the first and second working points are adjusted by open-loop regulation of a speed $n_5$ of the exhaust gas turbine or a value of the exhaust gas turbine that characterizes this speed.

7. The method of claim 6, further comprising comparing a value that characterizes the actual speed of the exhaust gas turbine and is continuously determined to the set speed $n_{set-5}$ that is to be adjusted, and producing a set value for controlling the hydrodynamic coupling in advance as a function of the regulated deviation.

8. The method of claim 1, further comprising detecting the operating state of braking operation with the engine brake in the presence of a speed $n_5$ of the exhaust gas turbine that is greater than the speed of the crankshaft taking into consideration the gear ratio in the transfer device, and detecting the partial load operation or thrust operation in the presence of a speed $n_5$ in the exhaust gas turbine, again taking into consideration the gear ratio in the transfer device, that is smaller than the speed $n_4$ of the crankshaft, excluding full-load operation.

9. A driveline for a motor vehicle comprising:

an internal combustion engine comprising a crankshaft;

an exhaust gas turbine, which is disposed in the exhaust gas flow of the internal combustion engine for the conversion of exhaust gas energy and drive energy, the exhaust gas turbine being operably connected to the crankshaft via a transfer device;

a hydrodynamic coupling comprising a primary wheel and a secondary wheel disposed in the transfer device, wherein the secondary wheel is coupled with the crankshaft and the primary wheel is coupled with the exhaust gas turbine, wherein the hydrodynamic coupling has a transferable moment, taking into consideration the gear ratio in the transfer device, that corresponds to a minimum moment $M_{min-5}$ that is transferred by the exhaust gas turbine over a major part of the speed ratio between the primary wheel and the secondary wheel, wherein the hydrodynamic coupling has a moment transfer equal to a minimum outputtable moment $M_5$ during a braking operation, and wherein the exhaust gas turbine has a control speed that is produced whereby the control speed is equal to a minimum speed $n_{min-5}$ that is kept as small as possible during the partial load or thrust operation.

10. The driveline according to claim 9, wherein the hydrodynamic coupling is designed as a closed-loop controllable or open-loop regulatable coupling with a variable filling ratio; and the hydrodynamic coupling has a control device that comprises a setting device for forming the set value for the control of a setting device of the hydrodynamic coupling.

11. A hydrodynamic coupling for a drive unit having a crankshaft and an exhaust gas turbine connected to the crankshaft by a transfer device along an exhaust path of an internal combustion engine, the hydrodynamic coupling comprising:

a primary wheel and a secondary wheel in the transfer device, the secondary wheel being operably coupled to the crankshaft and the primary wheel being operably coupled to the exhaust gas turbine; and a control device that comprises a setting device for forming a set value for the control of the setting device of the hydrodynamic coupling, wherein the hydrodynamic coupling is a closed-loop controllable or open-loop regulatable coupling with a variable filling ratio, wherein adjusting of first and second working points of the exhaust gas turbine is conducted via the hydrodynamic coupling, wherein a transferable moment of the hydrodynamic coupling corresponds to a minimum moment $M_{min-5}$ that is transferred by the exhaust gas turbine over most of a speed difference, and wherein the hydrodynamic coupling has a constant filling ratio FG, the filling ratio FG having a moment course which lies, over a substantial portion of the speed difference, in the region of the minimum moment $M_{min-5}$ that is transferred by the exhaust gas turbine, wherein the hydrodynamic coupling has a moment transfer equal to a minimum outputtable moment $M_5$ during the braking operation, and wherein the exhaust gas turbine has a control speed that is produced whereby the control speed is equal to a minimum speed $n_{min-5}$ that is kept as small as possible during a partial load or thrust operation.

12. The coupling of claim 11, wherein the filling ratio FG is regulated by at least one of the following values:

the pressure at an inlet of a working chamber of the hydrodynamic coupling and/or at an outlet of the working chamber of the hydrodynamic coupling, the pressure difference between the inlet and outlet of the working chamber, the volumetric flow at the inlet and/or outlet of the working chamber, or the quantity of working medium discharged.

13. The coupling of claim 11, wherein the first and second working points are adjusted by closed-loop control of a speed $n_5$ of the exhaust gas turbine.

14. The coupling of claim 11, wherein the first and second working points are adjusted by open-loop regulation of a speed $n_5$ of the exhaust gas turbine.

\* \* \* \* \*